Sept. 15, 1942.   H. E. McWANE   2,295,858
WATER JACKETED MOLD AND METHOD OF MAKING SAME
Filed June 29, 1939   2 Sheets-Sheet 1
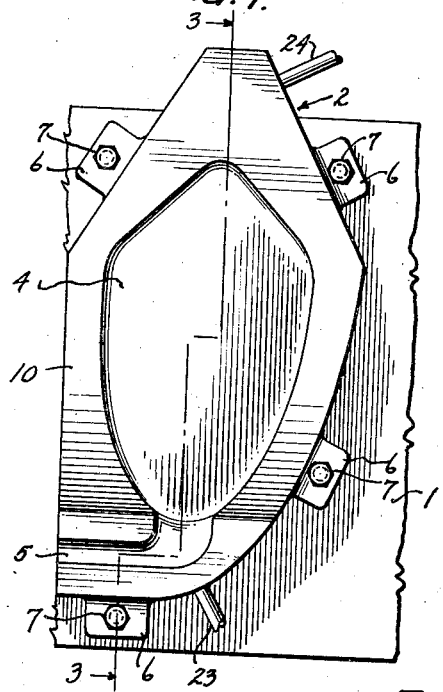
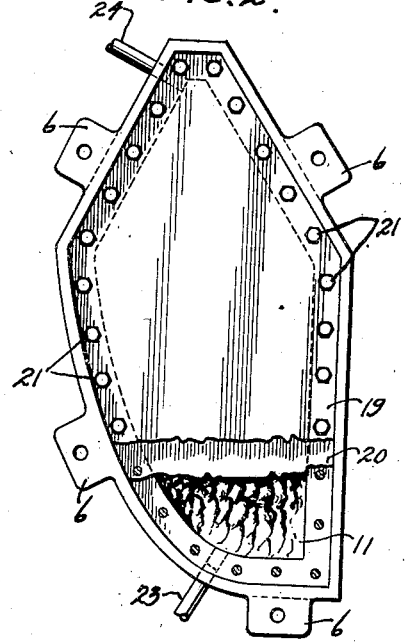
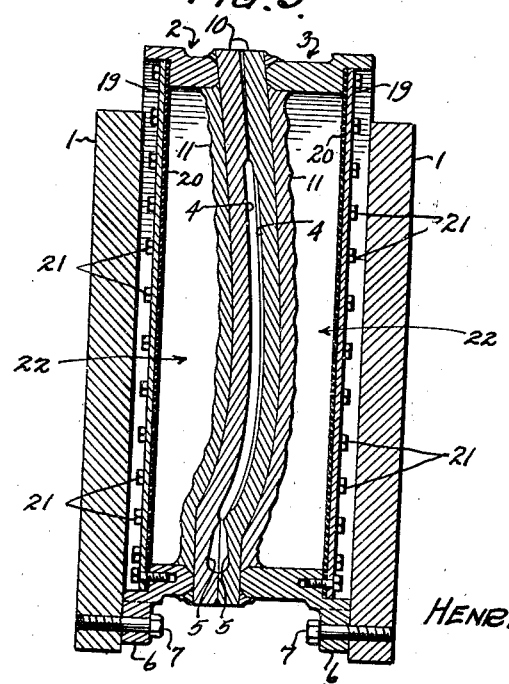
Inventor
HENRY E. McWANE
By Semmes, Keegin & Semmes
Attorneys

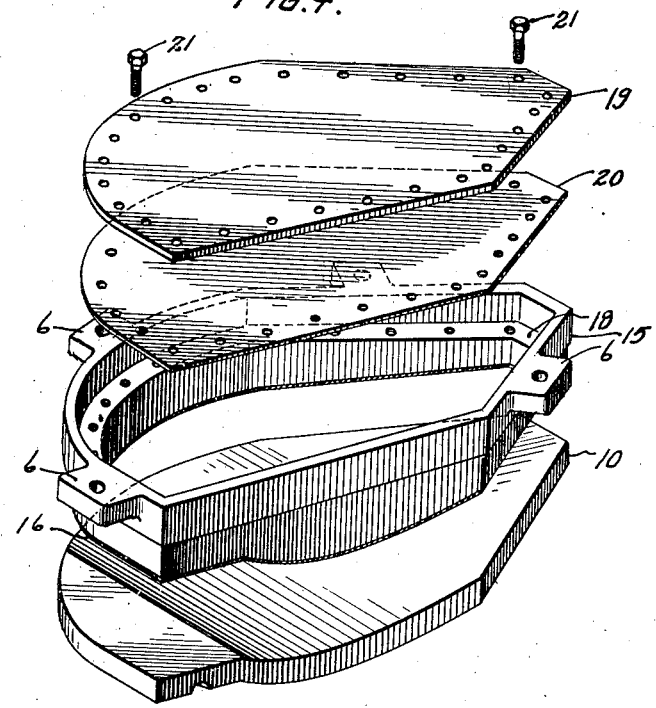
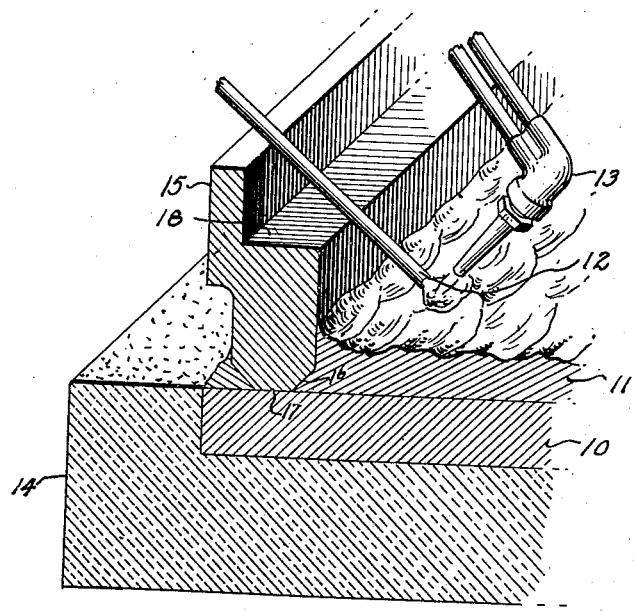

Patented Sept. 15, 1942

2,295,858

UNITED STATES PATENT OFFICE 2,295,858

WATER JACKETED MOLD AND METHOD OF MAKING SAME

Henry E. McWane, Lynchburg, Va.

Application June 29, 1939, Serial No. 281,972

6 Claims. (Cl. 29—148.2)

My invention relates to water-jacketed molds and methods of making the same.

An object is to provide a method for making water-jacketed permanent molds that is cheap and effective.

Another object is to provide a water-jacketed mold that is durable, inexpensive, and efficient in operation.

In general in carrying out my process I use a mold face of highly ductile metal of high heat conductivity and weld a backing to the mold face. This backing is in general built up by using a metal of suitable composition welded in position on the backing, the welding being continued until the backing has the desired thickness. The mold face should be of a metal which is resistant to heat checking under repeated heating and cooling. The metal of the backing welded to the mold face should be of a metal which does not warp readily under repeated heatings and coolings and which acts as a strengthening backing to prevent warpage of the metal of the face.

The side walls of the water jacket are welded in place while the backing is being built up, thus forming a construction which is very strong and resistant to warping since the intimate connection of the backing with the side walls of the water jacket strengthen the combination to resist warping. The process is very simple. Among other advantages is that the operation of fixing the side walls of the jacket in place is accomplished at the same time that the backing is being built up. Another important feature of the process consists in the step of imbedding the mold face in a holding material of low heat conductivity, thus tending to maintain the face and the backing during the period of building up the backing at a relatively high temperature insuring that the backing will adhere to the mold face. Without this mounting of the mold face in a heat insulating material during the process of building up the welded backing, there is danger of separation of the backing and the weld due to repeated change in temperature during the welding process.

In the drawings:

Figure 1 is a top plan view of a mold half in place on a support.

Fig. 2 is a bottom view of the mold half with parts broken away to more clearly show the construction.

Fig. 3 is a view taken along the line 3—3 of Fig. 1, looking in the direction of the arrows.

Fig. 4 is a perspective exploded view of the mold and water jacket assembly.

Fig. 5 is a perspective view of the welding operation for attaching the backing to the mold face.

Referring to the drawings, I have shown a base 1 on which is mounted a mold half 2. It is to be understood that the mold half 2 has a complemental half 3 not shown in Fig. 1, though such complemental half is indicated in the cross sectional view of Fig. 3. The mold half 2 is provided with cavity 4, which in the present instance is one suitable for casting mold board for a plow. Leading into the cavity 4 is a channel 5 which is in communication with a gate, not shown, through which molten metal is poured into the mold formed by the adjacent cavities of the two mold halves 2 and 3.

The mold half 2 is provided with lugs 6 which are bolted by bolts 7 to the support 1. The mold half comprises a face 10 which may be of commercially pure copper, so-called "prime" copper, silver or electrolytic iron. The face 10 must be of high heat conductivity, relatively high ductility, and, in particular, must have the property of resisting repeated heatings and coolings without checking or cracking. In order to keep the mold face 10 from warping, I have attached to the mold face a backing 11 which is welded to the mold face 10. This backing 11 is built up from suitable metal, as indicated at 12 in Fig. 5, this metal being flowed onto the back of the mold face or welded in place by means of a welding torch 13.

In order to maintain a reasonably constant temperature during the welding process, I have mounted the mold face 10 in a base or support of heat insulating material. This heat insulating material, such as plaster of Paris, I have indicated at 14 (see Fig. 5).

By reason of the heat insulating base 14, the weld between the backing 11 and the face 10 is strong and will hold during repeated usage. The backing 11 may be of bronze or some other metal such as cast iron or steel which is resistant to warpage under repeated heating and cooling.

The tendency of the mold face 10 to warp is also minimized by forming the side walls 15 of the water jacket by welding the side walls in place during the building up of the backing 11.

The side wall 15 is provided with a bevel 16 at its lower side and the edge 17 of the side wall rests against the face 10.

The whole operation of building up the strengthening backing and welding the side walls of the water jacket in place is accomplished in one operation. The side walls 16 are provided with a shoulder 18 on which is adapted to rest the cover of the water jacket.

The cover of the water jacket consists of a metallic cover plate 19 and a sheet 20 of rubber or other suitable material forming a waterproof gasket. The cover plate 19 and the waterproof gasket 20 are held in place by means of bolts 21, which are screwed into the shoulder 18 of the water jacket. It will be noted that the lugs 6, which hold the mold half in place on the support member 1, are formed on the side walls 16 of the water jacket. I have applied the numeral 22 to the water jacket. This water jacket has the usual inflow pipe 23 and outflow pipe 24 for the cooling fluid.

I desire that this invention be limited only by the scope of the appended claims and the showing of the prior art.

I claim:

1. A water-jacketed mold comprising a mold face of metal highly resistant to checking under repeated heating and cooling, a backing and side walls therefor, said backing being built up from relatively small particles of metal welded on the face and built up into a back of the required thickness, the said side walls being welded in place as the backing is built up.

2. A water-jacketed mold comprising a mold face of metal highly resistant to checking under repeated heating and cooling, a backing and side walls therefor, said backing being built up from relatively small particles of metal welded on the face and built up into a back of the required thickness, the said side walls being welded in place as the backing is built up, and a removable cover plate supported by the side walls.

3. A water-jacketed mold comprising a mold face of metal highly resistant to checking under repeated heating and cooling, a backing and side walls therefor, said backing being built up from relatively small particles of metal welded on the face and built up into a back of the required thickness, said side walls being welded in place as the backing is built up, a shoulder provided on said side walls, and a removable cover plate carried by the shoulder on said side walls.

4. A water-jacketed mold comprising a mold face of copper, a bronze backing and side walls therefor, the backing being built up from relatively small particles of bronze welded on the face and built up into a back of the required thickness, the side walls being welded in place as the backing is built up.

5. A method of forming a water-jacketed mold comprising the steps of forming a mold cavity, building up the backing by welding relatively small particles of backing metal thereon and simultaneously welding the side walls of the water jacket in place and continuing the building up process until the backing is of the desired thickness.

6. A method of forming a water-jacketed mold comprising forming a mold cavity of metal highly resistant to checking to repeated heating and cooling, building up a backing therefor by welding relatively small pieces of backing metal thereon and simultaneously attaching the side walls of the water jacket in position, and continuing this building up process until the backing is of the desired thickness.

HENRY E. McWANE.